Aug. 8, 1967 KENGO MATSUMOTO 3,335,412

ABRASION RESISTANT MAGNETIC HEAD

Filed Sept. 3, 1963 2 Sheets-Sheet 1

Inventor
Kengo Matsumoto by Hill Sherman Meroni Gross & Simpson

Attys.

Aug. 8, 1967 KENGO MATSUMOTO 3,335,412

ABRASION RESISTANT MAGNETIC HEAD

Filed Sept. 3, 1963 2 Sheets-Sheet 2

Inventor
Kengo Matsumoto by Hill Sherman Meroni Gross & Simpson

Attys.

United States Patent Office 3,335,412

Patented Aug. 8, 1967

3,335,412

ABRASION RESISTANT MAGNETIC HEAD

Kengo Matsumoto, Ohta-ku, Tokyo, Japan, assignor to Sony Corporation, Tokyo, Japan, a corporation of Japan Filed Sept. 3, 1963, Ser. No. 306,066
Claims priority, application Japan, Sept. 17, 1962, 37/40,270
6 Claims. (Cl. 340—174.1)

ABSTRACT OF THE DISCLOSURE

Magnetic head employing half core members secured to each other to provide a core and having magnetic tip members of high permeability material secured to flat upper planar areas of the core and defining a working gap, and a non-magnetic conductive element conforming to the shape of the half core members in the vicinity of the gap and having a pointed end portion extending substantially to the gap.

The present application is a continuation in part of my copending application Ser. No. 238,848 filed Mar. 20, 1962, now U.S. Patent No. 3,302,271.

This invention relates to a magnetic head of the type employed in conjunction with a magnetic recording member to record and reproduce intelligence. It applies more specifically to a magnetic head in which metallic tips of a magnetic material are employed in conjunction with a magnetic core composed of a different magnetic material. The basic advantages of the head of the present invention lie in the ease of manufacture, and higher sensitivity particularly for signals at high frequencies, as compared with magnetic heads heretofore employed for similar purposes.

In my copending application, U.S. Ser. No. 238,848 filed Mar. 20, 1962, I have described a method of manufacturing magnetic head assemblies which produce extremely sensitive instruments for recording and reproducing signals. These heads have been found to be particularly useful in magnetic video recording at high frequency levels on the order of several megacycles. It has been found, for example, that the recording and reproducing sensitivities with the new heads can be increased by at least 6 to 9 db as compared with conventional magnetic heads.

One of the objects of the present invention is to provide a magnetic head which is highly suitable for use in highly sensitive magnetic video tape recorders of small size.

Another object of the invention is to provide an improved magnetic head in which the portions of the head engaging the record member are provided with high permeability characteristics and excellent resistance to abrasion.

A further object of the invention is to provide an improved magnetic head structure without magnetic discontinuities in the vicinity of the working gap.

In the preferred embodiment of the present invention, the magnetic head includes a pair of half core members secured together to provide a core having opposed legs. A coil is disposed on each of the legs for energizing the same with electrical impulses. The improved core of the present invention has flat upper areas formed thereon which have side faces aligned in confronting relation, the thicknesses of the legs diminishing toward the area of the gap to provide flat areas beneath the flat upper areas. A pair of magnetic tip members composed of a high permeability material is secured to the flat upper area in substantially coextensive relation with said areas, the tip members defining a working gap for a magnetic recording medium. A non-magnetic, electrically conductive body is disposed within the space between the core legs, the conductive body having edge portions conforming to the flat lower areas and extending substantially to the coils wound on the legs, so that there is no space provided between the conductive body and the upper ends of the coils. The conductive body also has a pointed end portion extending substantially to the working gap to control stray flux appearing at the gap.

Other objects and features of the present invention will be apparent to those skilled in the art from the following description taken in conjunction with the accompanying drawings in which.

As shown in the drawings.

Figure 1:
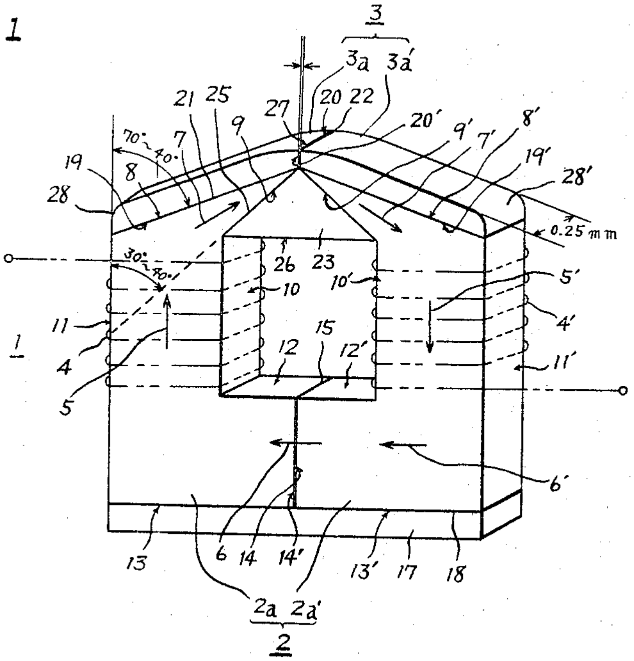
FIGURE 1 is a perspective view of one form of head produced according to the present invention.
Figure 2:
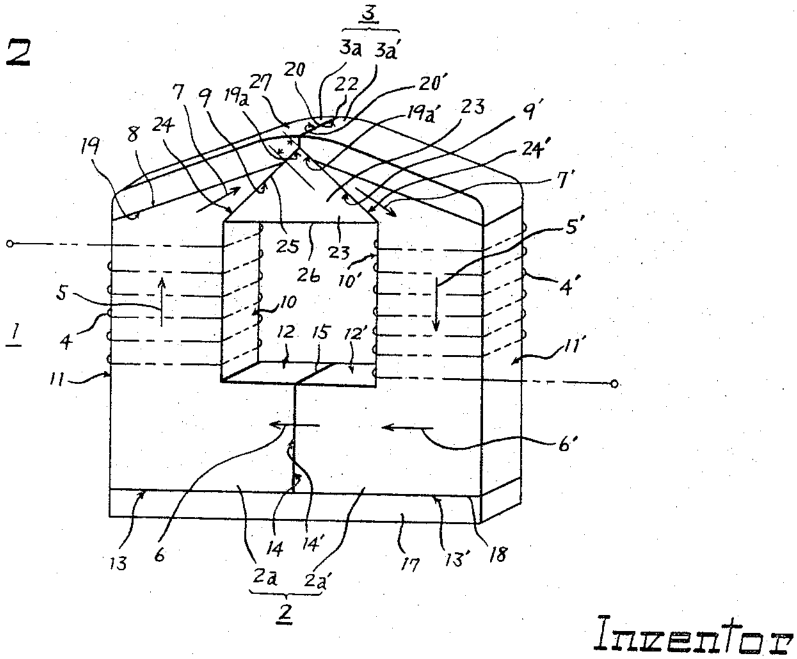
FIGURE 2 is a perspective view of another embodiment of the invention.

In FIGURES 1 and 2, reference numeral 1 indicates generally a magnetic head produced according to the present invention, and including a magnetic core 2, and a record engaging tip generally indicated at reference numeral 3 in both figures. The magnetic core 2 consists of a pair of half cores 2*a* and 2*a'* preferably composed of a ferrite material such as a soft ferrite having low loss characteristics at high frequencies. The constitution of such ferrite materials is well known in the art of magnetic materials, and need not be repeated here.

The half core members 2*a* and 2*a'* are disposed in confronting, symmetrical relation. The half core portions provide legs upon which a pair of coils 4 and 4' are wound. The main magnetic path existing through the core structure has been identified as reference numerals 5, 5', 6, 6', 7 and 7' in FIGURES 1 and 2. (Since the two core halves are identical corresponding elements in each have been given the same number but the elements on the right-hand half have been given a prime superscript).

The core halves are provided with flat, planar surfaces 8 and 8' at the upper extremities thereof, the surfaces 8 and 8' being disposed at angles of from 40 to 70° with respect to the direction of the main magnetic path indicated at reference numeral 5. The configuration of the core halves is tapered as indicated at reference numerals 9 and 9' to form flat angularly extending surfaces to the area in which the two core halves converge. As indicated in FIGURE 1, the angle between the surfaces 9 and 9' and the direction of the main magnetic flux indicated by reference numeral 5 is preferably from 30 to 40°.

The opposite side faces 10 and 11 of the legs of the core are also flat surfaces, as are the inner and outer side faces 12 and 13. The end face 13 is, of course, at right angles with respect to the plane in which the main magnetic field represented by reference numeral 5 extends.

The pointed ends of the core structure provided by the configuration of the angularly disposed surfaces 9 and 9' can be such that the pointed ends of these surfaces are in contact with each other as shown in FIGURE 1, or separated by a gap as illustrated in the embodiment of FIGURE 2.

The abutting end faces of the two core halves, represented at reference numerals 14 and 14' are secured together, preferably with a suitable adhesive layer 15 to provide the composite magnetic core.

In the embodiment shown in FIGURE 2, the planes of the intersecting faces 9 and 9' intersect at a point closely spaced from the extremities of the surfaces 9 and 9' themselves, and this distance should be on the order of about 0.2 millimeter where the head is to be used for the recording of video signals.

It is also advisable to secure some reinforcing means such as a supporting plate 17 to the bottom faces 13 and 13' of the core halves, the plate 17 being composed of glass or the like.

The pole tip 3 consists of a pair of tip members 3a and 3'a which normally will be of exactly the same shape and structure. The tip member 3a has an inner flat surface 19 which is substantially coextensive with the upper flat surface 8 of the core half 2a, or a little longer. It is also provided with a flat end face 20 which is substantially rectangular in cross-section. The material of the pole tips 3a and 3'a is one having high permeability and excellent abrasion resistance. Particularly good results have been obtained from the use of an iron-silicon-aluminum alloy such as "S-alloy" or an iron-aluminum alloy of the type known as "Alfenol." The tip members 3'a are attached to the magnetic core 1 with their flat surfaces 19 and 19' registering with the flat surfaces 8 and 8' by means of an adhesive layer 21. When assembled, the end faces 20 and 20' of the tip members 3a and 3'a define a working gap 22 for contact with the moving magnetic recording medium. The adhesive layer 21 should be coated uniformly onto the surfaces, and as thin as possible. Generally, the thickness of the adhesive layer 21 should be less than about 5 microns, and is preferably about 1 micron. The gap length of the working gap 22 is usually less than 5 microns and is selected in accordance with the frequency range of operation. For example, when operating with video signals of a frequency of about 5 megacycles, the gap length is on the order of 1 micron.

Where the confronting ends of the half core members 2a and 2a' are practically in contact with each other as illustrated in FIGURE 1, the flat surfaces 19 and 19' of the tip members 3a and 3'a which define the gap 22 exist in a single plane. However, where the confronting ends of the two half core members are provided with a gap therebetween as shown in FIGURE 2, it leaves faces 19a and 19a' extending in the same planes as the inner faces 9 and 9' of the angularly disposed legs of the core, and the free ends extend to end faces 20 and 20', forming the gap 22.

In accordance with the present invention, the window or space between the confronting leg portions of the core is partly filled with a non-magnetic electrically conductive material such as copper or eutectic solder in the form of an insert 23. In the form of the invention illustrated, the insert 23 is substantially an isosceles triangle in cross-section having faces 24 and 24' along the flat surfaces 9 and 9', and being attached thereto by means of an adhesive layer 25. The pointed end of the insert 23 extends substantially up to the working air gap 22, that is, to a point between the end faces 20 and 20' which define the gap. The bottom portion of the insert 23, identified at reference numeral 26 is of flat configuration and extends sufficiently far so that there is substantially no free space between the bottom surface 26 and the upper extremities of the coils 4 and 4' wound on the legs of the core. With this construction, the external leakage flux is supressed.

The pole tip 3 is ground or polished in the neighborhood of the gap 22 so that it has a smooth curved surface for good contact with a magnetic record medium. It is, of course, possible to grind the entire front of the tip members 3a and 3'a to provide the entire pole tip with a curved surface. It is particularly desirable to round the edges 20a and 20a' of the tip members 3a and 3'a.

The magnetic head of the present invention finds particular application where extremely small sized magnetic heads are required, such as those having a track width of only about 0.25 millimeter. The manufacture of such devices becomes very difficult and almost impossible on a mass production basis. It is accordingly preferred that the method of manufacture of magnetic heads described in my aforementioned U.S. Ser. No. 238,848 be employed. In essence, this method consists in first providing a bar of magnetic material from which the half core member 2a is ground to provide the flat surface 8 extending the full longitudinal extent of the bar. A polished sheet of a magnetic material for forming the tip member 3a is secured on the flat surface 8. Then, or before securing the polished sheet to the core, the bar is cut to provide the legs upon which the coils will be wound. The flat surfaces 9, 10, 12 and 20 are then cut into the bar and the end face 14 is finished off, thus completing the half core member. Another half core member is prepared in the same way, and this pair of half core members is then assembled together, and the composite core is cut at right angles to its lengthwise dimension to provide the individual magnetic head of very small thickness dimensions, on the order of 0.25 millimeter. With this method, the tip 3 can be accurately and easily mounted on the core and in addition the working gap to be defined by the tip member can be formed with high precision.

With the described method, the magnetic heads can be mass produced quite conveniently. The attachment of the tip 3 to the core 2 is quite simple, and the composite magnetic core is formed of rectilinear pieces so that a complicated grinding machine is not necessary. Since the surfaces 8 and 8' of the core 2 and the surfaces 19 and 19' of the tip 3 are flat, the adhesive layer 21 can be interposed in a uniform manner and made as thin as is desired. The result is that the magnetic characteristics are highly improved and the reluctance due to the adhesive layer 21 is reduced.

Since the tip 3 extends over the entire front of the magnetic head, there is no magnetic discontinuity, as compared with the case where a pole tip is provided in the vicinity of the gap. Accordingly, there is no tendency to cause the so-called "contour effect" when using relatively long wave bands.

At high frequencies, the magnetic flux density increases in a layer near the surface of the core, and there is some leakage of the magnetic flux on the surface of the core. However, since the tip 3 of high permeability material is provided over the entire front of the core member 2, the magnetic flux flows from the core to the tip and minimizes the amount of leakage of such flux. Furthermore, since the core 2 extends essentially up to the working air gap 22, the magnetic flux passing through the tip 3 decreases and the magnetic resistance to the magnetic flux passing through the gap decreases. As a result, the leakage of magnetic flux is decreased and substantially all of the magnetic flux produced by the coils must pass through the air gap 22 so that the magnetic head becomes highly sensitive.

Figure 3:
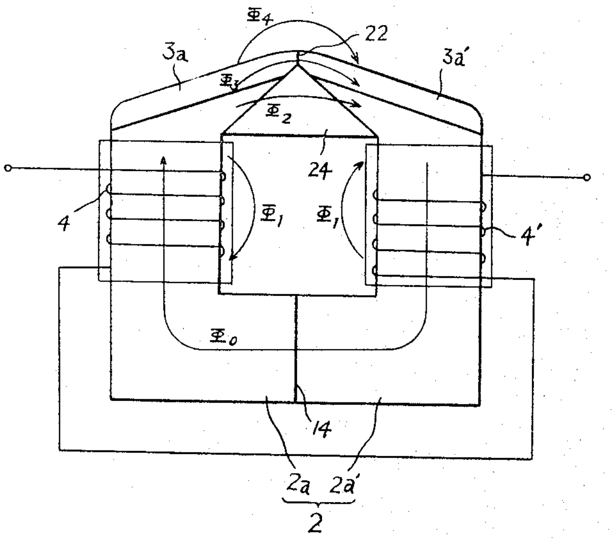
FIGURE 3 is a schematic diagram useful in explaining the magnetic characteristics of the heads of the present invention.

The further description of the present invention will be made in connection with the scrematic diagram of FIGURE 3. As shown in that figure, a magnetic flux $\Phi_0$ flows into the core 2 when an electric current is applied to the coils 4 and 4'. This flux, $\Phi_0$ is the sum of a magnetic flux $\Phi_2$ which passes through the conductive insert 23, a magnetic flux $\Phi_3$ which passes through the gap 22, and a space flux $\Phi_4$ around the gap 22. By measuring the coupling coefficients of the magnetic flux $\Phi_1$ to be produced in the space around the two coils 4 and 4', the ratio of $\Phi_1$ to $\Phi_0$ can be determined. In a low frequency range of audio signals, the ratio $\Phi_1$ to $\Phi_0$ is approximately 0.05. At higher frequency ranges the ratio $\Phi_1$ to $\Phi_0$ is about 0.3 at 1 megacycle, and about 0.4 at 3 megacycles, since the permeability of the tip 3 decreases as the frequency increases. In contrast, in conventional heads, even those provided with pole tips, the ratio $\Phi_1$ to $\Phi_0$ is never lower than about 0.9 which is substantially in excess of the values obtainable with the magnetic head of the present invention. This means that the magnetic leakage flux is low and substantially all the magnetic flux passes through the gap, to increase the recording sensitivity.

Figure 4:
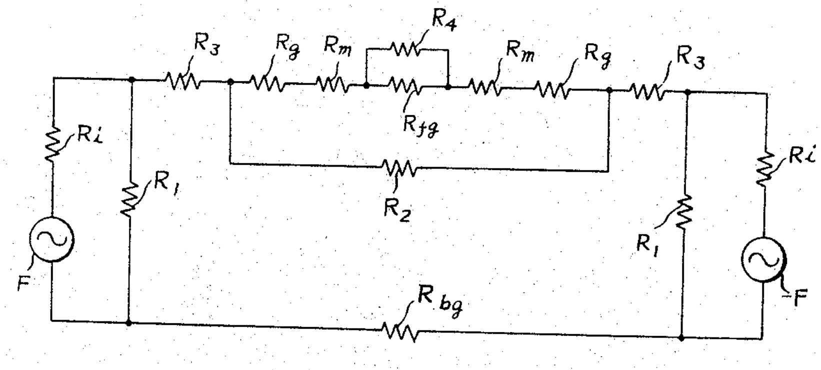
FIGURE 4 is a circuit diagram of the equivalent magnetic circuit for the heads of the present invention.

The magnetic circuit has been analogized to a conventional resistance circuit in FIGURE 4. The magnetic resistance of the main magnetic path 5 and the return magnetic path 6 of the core is represented by $R_i$, the magnetic resistance of the magnetic path 7 is represented by $R_3$ and the magnetic resistance of the back gap 14 of the core is represented by $R_{bg}$. The space magnetic resistance to the flux $\Phi_1$ is $R_1$ and the magnetic resistance to the flux $\Phi_2$ is $R_2$. The magnetic resistance to $\Phi_3$ at the gap 22 is $R_{fg}$, and the magnetic resistance of the tip 3 is $R_m$. The magnetic resistance between the core 2 and the tip 3 is represented by $R_g$. The space magnetic resistance to the flux $\Phi_4$ is represented by $R_4$. The generator F in FIGURE 4 represents a magnetic force.

When using a core and a tip whose permeabilities are, respectively, two thousand and twenty at one megacycle, the corresponding magnetic resistances are as follows:

$R_i=2\times10^{-2}$ E.M.U.
$R_3=7\times10^{-2}$ E.M.U.
$R_g=0.45$ (at a gap length of 5 microns) and approximately $9\times10^{-5}$ at a gap length of 1 micron
$R_m=3.5$ E.M.U.
$R_{fg}=0.35$ E.M.U.
$R_{bg}=2.4\times10^{-2}$ E.M.U.
$R_1=16$ (approx.)

The remaining resistance, $R_2$ is the magnetic resistance of a non-magnetic material so that it is sufficiently high to be ignored. Since $R_2$ becomes so large, $\Phi_2$ becomes small, thereby increasing $\Phi_3$ and thereby increasing the sensitivity. The resistance $R_4$ is large enough to be neglected.

Figure 5:
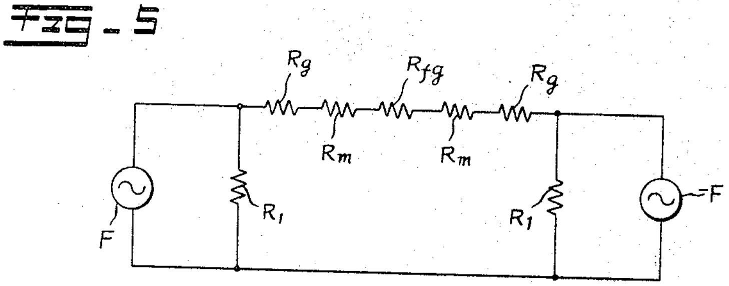
FIGURE 5 is a simplified equivalent circuit based upon FIGURE 4.

With the elimination of $R_i$, $R_3$, $R_2$ and $R_4$, the circuit of FIGURE 4 can be simplified to that form shown in FIGURE 5. From FIGURE 5, it will be seen that the value of $R_1$ divided by the sum of $R_{fg}$, $2R_m$, and $2R_g$ wil be made large so as to increase the recording sensitivity. The value $R_{fg}$ is determined by the mechanical strength and the abrasion of the tip, and the like. Since the core 2 of high permeability material extends near the gap 22 formed by the tip 3, the value of $R_m$ is small. In addition, the resistance $R_g$ between the tip 3 and the core 2 may also be reduced to a minimum because the tip is attached flat to the core and the adhesive layer may be made very thin. With these improvements, the recording sensitivity can be increased to a value of about 9.5 to 11 db which is in the range of 3 to 3½ times as high as that of magnetic heads heretofore employed. This substantial improvement in magnetic recording characteristics is particularly evident when operating on video signals.

It will be evident that various modifications can be made to the described embodiments without departing from the scope of the present invention.

I claim as my invention:

1. A magnetic head comprising a pair of half core members providing a core having opposed legs, a coil on each of said legs, said core having flat planar upper areas formed thereon, a pair of magnetic tip members composed of a high permeability material different from the material of said core, said tip members being secured to said flat planar upper areas, being substantially coextensive therewith, and defining a working gap for a magnetic record medium drawn across said head, and a non-magnetic conductive body disposed between the half core members and conforming to the shape of said half core members in the vicinity of said working gap, said conductive body having a pointed end portion extending substantially to but not extending into said working gap and extending downwardly into conformity with the inner sides of said legs.

2. The magnetic head of claim 1 in which the lower end of said conductive body is in close proximity to the upper ends of said coils.

3. A magnetic head comprising a pair of half core members secured together to provide a core having opposed legs, a coil on each of said legs, said core having flat upper areas formed thereon which terminate in confronting relation, the thickness of said legs diminishing toward the confronting area to provide flat lower areas beneath said flat upper areas, a pair of magnetic tip members composed of a high permeability material secured to said flat upper areas and being substantially coextensive therewith, said tip members defining a working gap for a magnetic recording medium drawn across said head, and a non-magnetic conductive body disposed within the space between said core legs, said conductive body having edge portions conforming to said flat lower areas, and said conductive body having a pointed end portion extending substantially to but not extending into said working gap.

4. The magnetic head of claim 3 in which said tip members are formed of an iron-silicon-aluminum alloy.

5. The magnetic head of claim 3 in which said tip members are formed of an iron-aluminum alloy.

6. The magnetic head of claim 3 in which said core is formed of a ferrite material.

References Cited

UNITED STATES PATENTS

| | | | |
|---|---|---|---|
| 2,711,945 | 6/1955 | Kornei | 346—74 |
| 2,786,897 | 3/1957 | Schwarz | 179—100.2 |
| 2,992,474 | 7/1961 | Adams et al. | 179—100.2 |
| 3,187,411 | 6/1965 | Duinker et al. | 179—100.2 |

BERNARD KONICK, *Primary Examiner.*

A. I. NEUSTADT, *Assistant Examiner.*